US008909022B1

(12) United States Patent
Kasten et al.

(10) Patent No.: US 8,909,022 B1
(45) Date of Patent: Dec. 9, 2014

(54) METHODS AND SYSTEMS FOR PROVIDING MEDIA CONTENT COLLECTED BY SENSORS OF A DEVICE (71) Applicant: Google Inc., Mountain View, CA (US)

(72) Inventors: Glenn Kasten, San Mateo, CA (US); James Fintan Kelly, Milpitas, CA (US); Nirdhar Khazanie, Greenville, NC (US); Joshua Michael Armour, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/137,223

(22) Filed: Dec. 20, 2013

Related U.S. Application Data (60) Provisional application No. 61/893,485, filed on Oct. 21, 2013.

(51) Int. Cl.
H04N 5/77 (2006.01)
H04N 5/78 (2006.01)
H04N 5/907 (2006.01)

(52) U.S. Cl.
CPC ............... H04N 5/772 (2013.01); H04N 5/78 (2013.01); H04N 5/907 (2013.01)
USPC ........................................................ 386/227

(58) Field of Classification Search
CPC ................... H04N 21/25875; H04N 21/4788; H04N 5/772; H04N 5/78
See application file for complete search history.

(56) References Cited

U.S. PATENT DOCUMENTS

| 5,282,092 A * | 1/1994 | Wilhelms ........................ 360/5 |
| 2006/0020966 A1* | 1/2006 | Poslinski ........................ 725/37 |
| 2013/0051772 A1* | 2/2013 | Ramaswamy et al. ........ 386/291 |
| 2013/0159234 A1* | 6/2013 | Xing et al. ..................... 706/46 |

OTHER PUBLICATIONS

Dellinger, "'Heard' App Review: Capture 5 minutes of audio before you even press 'record'", Digital Trends, accessed Dec. 20, 2013, http://www.digitaltrends.com/mobile/heard-app-review/.

* cited by examiner

Primary Examiner — Huy T Nguyen
(74) Attorney, Agent, or Firm — McDonnell Boehnen Hulbert & Berghoff LLP (57) ABSTRACT An example method may include continuously receiving, from a sensor of a computing device, media content collected from an ambient environment of the computing device on an ongoing basis. The method includes storing in a buffer an amount of the media content collected over a sliding time window, and removing stored media content from the buffer as the predetermined time period expires. The method may also include providing, by an operating system of the computing device, a listing of one or more applications configured to run on the computing device. The method further includes receiving, by the operating system of the computing device, a selection of an application from the listing of one or more applications, and based on the selection, causing the selected application to be initiated on the computing device and providing the portion of the media content to the application.

20 Claims, 6 Drawing Sheets

METHODS AND SYSTEMS FOR PROVIDING MEDIA CONTENT COLLECTED BY SENSORS OF A DEVICE

CROSS REFERENCE TO RELATED APPLICATION

The present disclosure claims priority to U.S. Provisional Patent Application No. 61/893,485, filed on Oct. 21, 2013, the entire contents of which are herein incorporated by reference.

BACKGROUND

Unless otherwise indicated herein, the materials described in this section are not prior art to the claims in this application and are not admitted to be prior art by inclusion in this section.

Many techniques and systems for capturing and storing ambient media content exist. For example, a portable audio recorder may be used that is a device capable of capturing ambient audio and saving the audio to a magnetic or digital storage medium. Alternatively, a portable video recorder could be used that may capture ambient video and audio content and save the content to a magnetic or digital storage medium. A portable audio or video recorder may be enabled, and then be configured to capture and store content until available storage space is consumed or the recorder is disabled.

SUMMARY

In one example, a method is provided that includes continuously receiving, from a sensor of a computing device, media content collected from an ambient environment of the computing device on an ongoing basis. The method further includes storing in a buffer an amount of the media content collected over a sliding time window and the sliding time window covers a predetermined time period that moves forward in time. The method further includes removing stored media content from the buffer as the predetermined time period expires. The method further includes providing, by an operating system of the computing device, a listing of one or more applications configured to run on the computing device and each application in the listing is configured to use the media content. The method further includes receiving, by the operating system of the computing device, a selection of an application from the listing of one or more applications and the selection indicates to share at least a portion of the media content stored in the buffer with the selected application. The method further includes, based on receiving the selection, causing the selected application to be initiated on the computing device and providing the portion of the media content to the application.

In another example, a computer readable storage memory having stored therein instructions, that when executed by a processor, cause the processor to perform functions is provided. The functions comprise continuously receiving, from a sensor of a computing device, media content collected from an ambient environment of the computing device on an ongoing basis. The functions further comprise storing in a buffer an amount of the media content collected over a sliding time window and the sliding time window covers a predetermined time period that moves forward in time. The functions further include removing stored media content from the buffer as the predetermined time period expires. The functions further include providing, by an operating system of the computing device, a listing of one or more applications configured to run on the computing device and each application in the listing is configured to use the media content. The functions further include receiving, by the operating system of the computing device, a selection of an application from the listing of one or more applications and the selection indicates to share at least a portion of the media content stored in the buffer with the selected application. The functions further include, based on receiving the selection, causing the selected application to be initiated on the computing device and providing the portion of the media content to the application.

In still another example, a system is provided that comprises one or more processors configured to execute functions of an operating system and memory configured to store instructions, that when executed by the one or more processors, cause the system to perform functions. The functions comprise continuously receiving media content collected from an ambient environment on an ongoing basis. The functions further comprise storing in a buffer an amount of the media content collected over a sliding time window and the sliding time window covers a predetermined time period that moves forward in time. The functions further include removing stored media content from the buffer as the predetermined time period expires. The functions further include providing, by the operating system, a listing of one or more applications configured to run on the system and each application in the listing is configured to use the media content. The functions further include receiving, by the operating system, a selection of an application from the listing of one or more applications and the selection indicates to share at least a portion of the media content stored in the buffer with the selected application. The functions further include, based on receiving the selection, causing the selected application to be initiated and providing the portion of the media content to the application.

In yet another example, a system is provided that includes a means for continuously receiving media content collected from an ambient environment on an ongoing basis. The system further comprises means for storing in a buffer an amount of the media content collected over a sliding time window and the sliding time window covers a predetermined time period that moves forward in time. The system further comprises means for removing stored media content from the buffer as the predetermined time period expires. The system further comprises means for providing, by an operating system, a listing of one or more applications configured to run on the system and each application in the listing is configured to use the media content. The system further comprises means for receiving, by the operating system, a selection of an application from the listing of one or more applications and the selection indicates to share at least a portion of the media content stored in the buffer with the selected application. The system further comprises means for, based on receiving the selection, causing the selected application to be initiated and means for providing the portion of the media content to the application.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a computing device may be configured to provide portions of collected ambient media content to applications by collecting media content with sensors and storing the media content in a circular buffer or other memory device. The ambient media content may be collected by sensors included in the computing device. Media content may comprise any sensory data including visible or audible sensory data that the computing device is configured to detect. Recently collected media content may be stored in the memory device in place of older media content. For example, the memory device may contain the media content collected during a preceding five minutes of time. The media content stored in the memory device may change as time progresses. The amount of media content stored in the memory device may be variable based on an input received from an input device. Collection or storage of media content may start or stop based on inputs received from an input device. Media content may also be stored in an additional memory device, based on an input received from an input device. The additional memory device may be configured for non-volatile storage of media content. These functions may be performed by a processor executing an operating system.

Within examples, a computing device may also be configured to provide a listing of applications configured to run on the computing device, by executing an operating system. The applications included in the listing may be configured to use media content collected by the computing device and stored in the memory device. The applications included in the listing may or may not be installed on the computing device. The computing device may also be configured to receive a selection of one or more applications by executing the operating system. The selection may indicate to share media content with the selected applications. The computing device may be configured to initialize the selected applications and provide the media content to the selected applications. The computing device may also be configured to provide a given portion of the stored media content to the selected applications.

Figure 1:
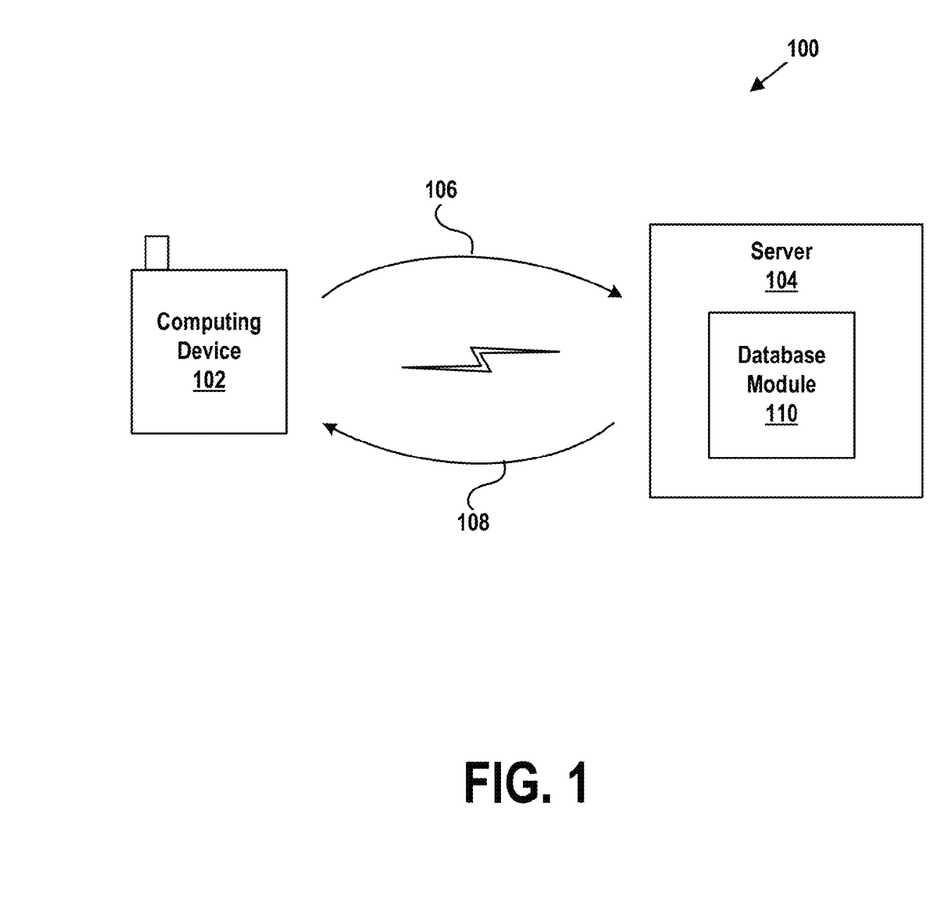
FIG. 1 illustrates an example communication system by which an example method may be implemented.

Referring now to the figures, FIG. 1 illustrates an example communication system 100 by which an example method may be implemented. The system 100 includes a computing device 102 that may communicate with a server 104 via one or more wired and/or wireless interfaces. The computing device 102 and the server 104 may communicate within a network. Alternatively, the computing device 102 and the server 104 may each reside within a respective network.

The computing device 102 may be any type of computing device or transmitter including a laptop computer, a mobile telephone, or tablet computing device, etc., that is configured to transmit data 106 to, or receive data 108 from, the server 104 in accordance with the method and functions described herein. The computing device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Server 104 may include the same components as computing device 102. Further, the server 104 may be configured to send data 108 to or receive data 106 from the computing device 102. The server 104 may have a database module 110 configured to receive data from multiple computing devices, to aggregate and store the data, and to provide for display the data in various forms. The database module 110 may include information regarding applications that are configured for use on the computing device 102.

The data 106 received by the server 104 from the computing device 102 may take various forms. For example, the computing device 102 may provide data 106 regarding whether certain applications are installed on the computing device 102. The computing device 102 may also provide data 106 about media content collected by a sensor of the computing device 102. For example, computing device 102 may provide data 106 to server 104 that indicates that a certain amount of media content collected by a sensor of computing device 102 may be audio or visual content. Data 106 may indicate that the media content may have been collected by a wireless internet receiver, radio antenna, GPS sensor, magnetometer, microphone, sound meter, photodetector, accelerometer, or camera. The server 104 may then store and aggregate the data for display.

The data 108 sent to the computing device 102 from the server 104 may take various forms. For example, the server 104 may send to the computing device 102 data 108 indicative of applications that are configured to use the media content collected by a sensor of computing device 102.

Figure 2:
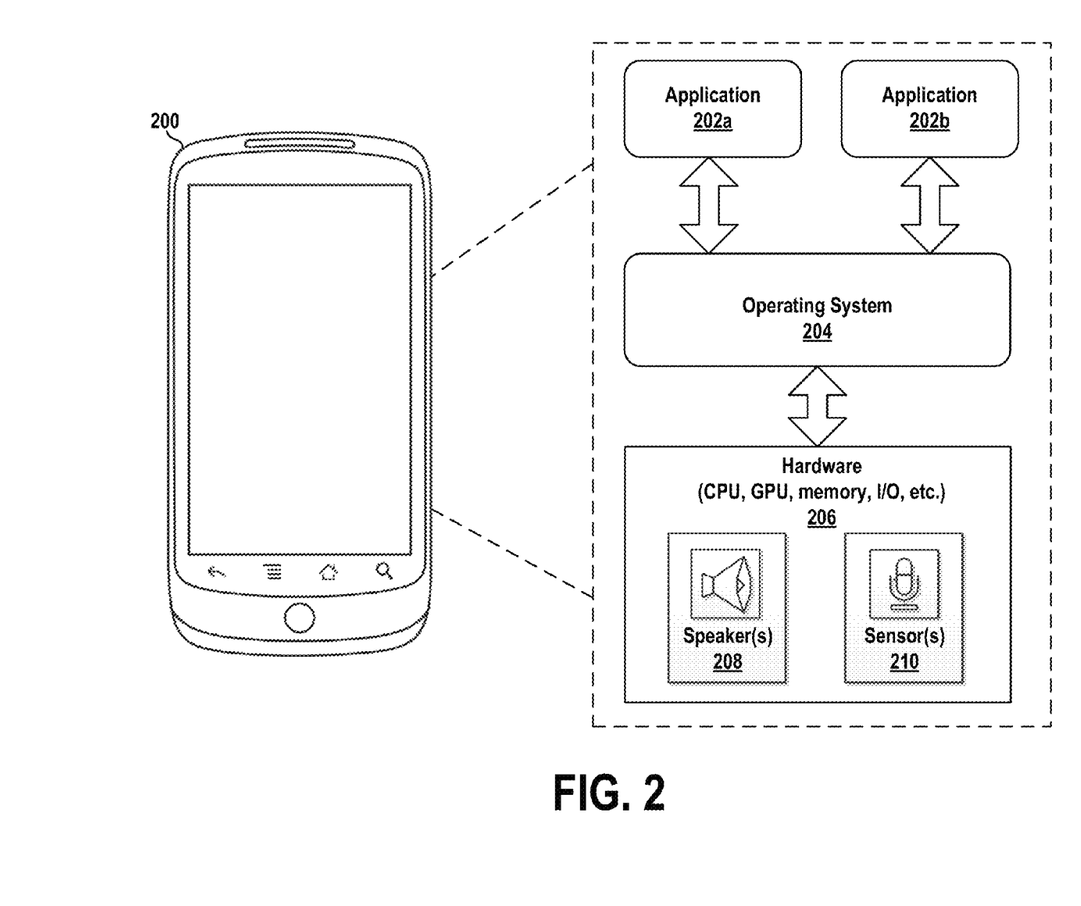
FIG. 2 illustrates an example computing device by which an example method may be implemented.

FIG. 2 illustrates an example computing device 200 by which an example method may be implemented. Computing device 200 may include applications 202a and 202b and an operating system 204 being executed by hardware 206. Hardware 206 may further include speaker(s) 208 and sensor(s) 210. Although the example computing device 200 is a smartphone, aspects of this disclosure are applicable to other computing devices such as desktop computers, laptops, tablet computers, etc.

Each of the applications 202a and 202b may include instructions that when executed cause the computing device 200 to perform specific tasks or functions. Applications 202a and 202b may be native applications (i.e., installed by a manufacturer of the computing device 200 and/or a manufacturer of the operating system 204) or may be a third-party applications installed by a user of the computing device 200 after purchasing the computing device. Applications 202a and 202b may be configured to use media content collected by sensor(s) 210 and provided by the CPU. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a voice recording application, a media identifier application, a voice transcription application, a bookmarking application, and a word processing, spreadsheet, and/or presentation application that accepts specifically formatted files as inputs and presents them via the output devices for viewing and/or editing.

The operating system 204 may interact with and manage the hardware 206 to provide services for the applications 202a and 202b. For example, an application 202a may request that the operating system 204 direct an integrated camera of hardware 206 to capture a visual image and that the hardware 206 store the image to memory. The operating system 204 may be executed by a CPU.

The hardware 206 may include, for example, a central processing unit (CPU), a graphics processor (GPU), memory, an input/output (I/O) interface, user input device(s), and output device(s). Hardware 206 may also include speaker(s) 208 and sensor(s) 210. Components of hardware 206 may be controlled by instructions included in applications 202a and 202b and operating system 204.

The central processing unit (CPU) may, for example, comprise a single or multi-core processor, an application specific integrated circuit (ASIC), field programmable gate array (FPGA), and/or any other suitable circuitry. The CPU may be operable to effectuate the operation of the computing device 200 by executing instructions stored in memory or disk storage. Such instructions may include the operating system 204 and the applications 202a and 202b. The CPU executing the instructions may cause media content to be written to or deleted from memory. The CPU may also receive media content from memory, media content from sensor(s) 210, and input data from an input/output interface. The CPU may also provide output data to an input/output interface.

The graphics processor may be operable to generate a video stream for output to a screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other memory. Program memory may store instructions executable by the CPU to effectuate operation of the operating system 204 and the applications 202a and 202b. Runtime memory may store data generated or used during execution of the operating system 204 or applications 202a and 202b. The memory may include a storage buffer that may store media content collected by sensor(s) 210 and provided by the CPU. The storage buffer may also provide stored media content to the CPU. As a default setting, the operating system may be configured to deny applications access to contents of the storage buffer until explicitly granted permission. Permission may be granted based on a user input.

The input/output (I/O) interface may be operable to receive signals from input device(s), and provide corresponding signals to the CPU and/or the graphics processor.

The input device(s) may include, for example, a mouse, a touchpad, a motion sensor, a trackball, a voice recognition device, a keyboard, or any other suitable input device which enables a user to interact with the computing device 200.

The output devices may include, for example, a screen and speakers. The screen may be, for example, a liquid crystal display (LCD) screen, an OLED screen, an e-ink screen, and/or any other suitable device for presenting a graphical user interface.

Speaker(s) 208 may be provided audio signals by hardware 206 and produce sound waves based on the audio signals. The audio signals may be provided by hardware 206 executing applications 202a or 202b, or operating system 204. Sensor(s) 210 may include a microphone configured to sense sound waves in the ambient environment of computing device 200. Sensor(s) 210 may also produce an audio signal based on the sound waves in the ambient environment of computing device 200. Sensor(s) 210 may provide the audio signal to hardware 206 which may further provide the signal for use by operating system 204 and applications 202a or 202b. Sensor(s) 210 may also include a camera configured to sense light waves in the ambient environment of computing device 200. The camera may be configured to collect both continuous video and still-frame images. Sensor(s) 210 may also produce a video signal based on the light waves in the ambient environment of computing device 200. Sensor(s) 210 may provide the video signal to hardware 206 which may further provide the signal for use by operating system 204 and applications 202a or 202b. Sensor(s) 210 may be configured to collect any media content including ambient audio or video content, or wireless transmissions including internet-streamed audio or video, or AM/FM radio.

Figure 3:
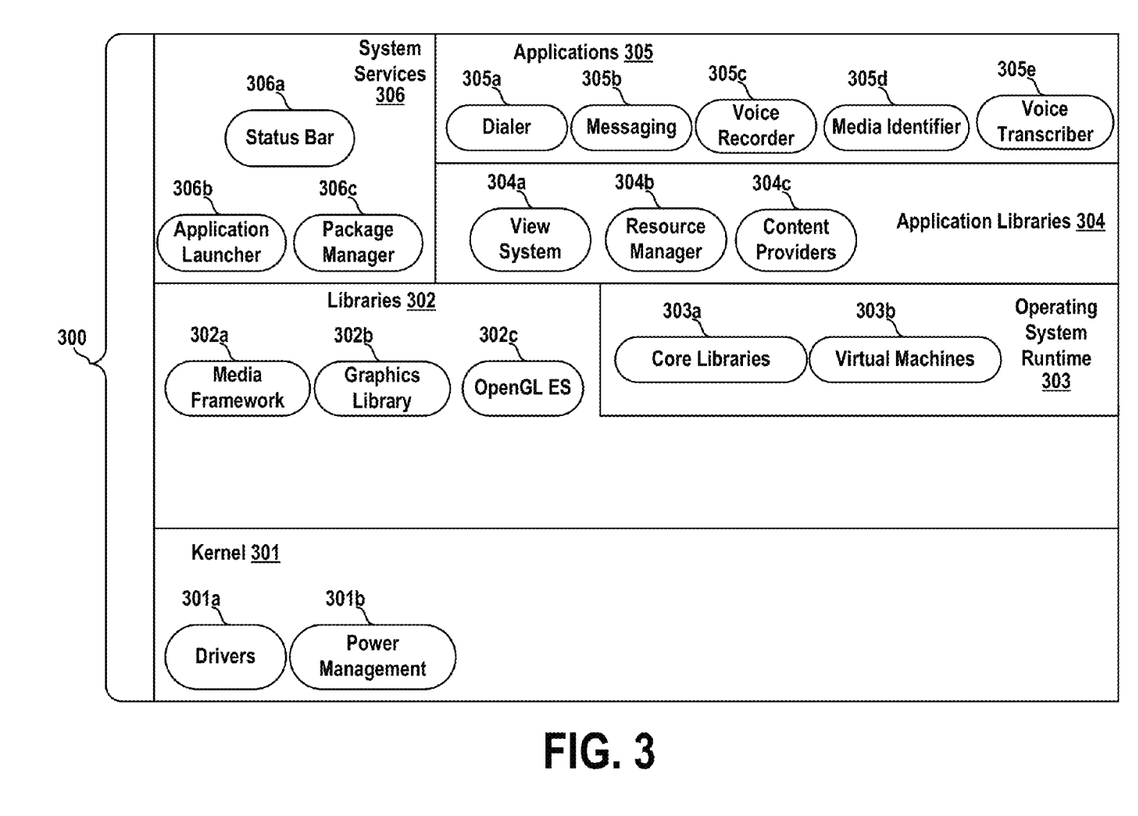
FIG. 3 is a block diagram illustrating example components of an operating system used by a computing device.

FIG. 3 is a block diagram illustrating example components of an operating system 300 used by a computing device. The operating system 300 may invoke multiple applications, while ensuring that an associated phone application is responsive and that wayward applications do not cause a fault of the operating system 300. Using task switching, the operating system 300 may allow for the switching of applications while on a telephone call, without losing the state of each associated application. The operating system 300 may use an application framework to enable reuse of components, and provide a scalable experience by combining pointing device and keyboard inputs and by allowing for pivoting. The operating system 300 may generally be organized into components including a kernel 301, libraries 302, an operating system runtime 303, application libraries 304, applications 305, and system services 306.

The kernel 301 may include drivers 301a that enable software such as the operating system 300 and applications 305 to interact with input/output devices. The kernel 301 may also include power management processes 301b that coordinate hardware power usage and provide alerts when an integrated battery is running low on power, for example.

The libraries 302 may include several subcomponents, such as media framework 302a, graphics library 302b, and OpenGL ES 302c. The media framework 302a may include functionality that supports standard video, audio and still-frame formats. The graphics library 302b may support two-dimensional application drawing. The OpenGL ES 302c may support gaming and three-dimensional graphics rendering.

The operating system runtime 303 may include core libraries 303a and virtual machines 303b. The virtual machines 303b may be custom virtual machines that run a customized file format. The virtual machines 303b may be used with an embedded environment since the virtual machines 303b use runtime memory efficiently, implement a CPU optimized bytecode interpreter, and support multiple virtual machine processes per device.

The application libraries 304 may include libraries for view system 304a, resource manager 304b, and content providers 304c. These application libraries may provide support for applications 305.

The applications 305 may include any number of applications, such as dialer 305a, messaging 305b, voice recorder 305c, media identifier 305d, and voice transcriber 305e. The dialer 305a may provide functionality related to placing or receiving phone calls. The messaging 305b may provide functionality related to receiving and sending messages, such as email, voice mail, or text messages. Voice recorder 305c may provide functionality related to sensing ambient sound waves and converting the sound waves into electronic data. Media identifier 305d may provide functionality related to determining the source of audio data. For example, if the audio data represents a musical recording, media identifier 305d may access a database to determine the artist(s) who composed the recording and when the recording was recorded. Voice transcriber 305e may provide functionality related to sensing ambient sound waves and converting the sound waves into data representing text. For example, voice transcriber 305e may be provided an input representing audible speech and may produce output data representing an English transcription of the audible speech. The voice transcriber 305e may be configured to produce outputs in many languages.

The system services 306 may include status bar 306a, application launcher 306b, and package manager 306c. The status bar 306a may provide functionality related to providing system notifications. The application launcher 306b may provide functionality related to organization and execution of applications 305. The package manager 306c may maintain information for installed applications 305.

Figure 4:
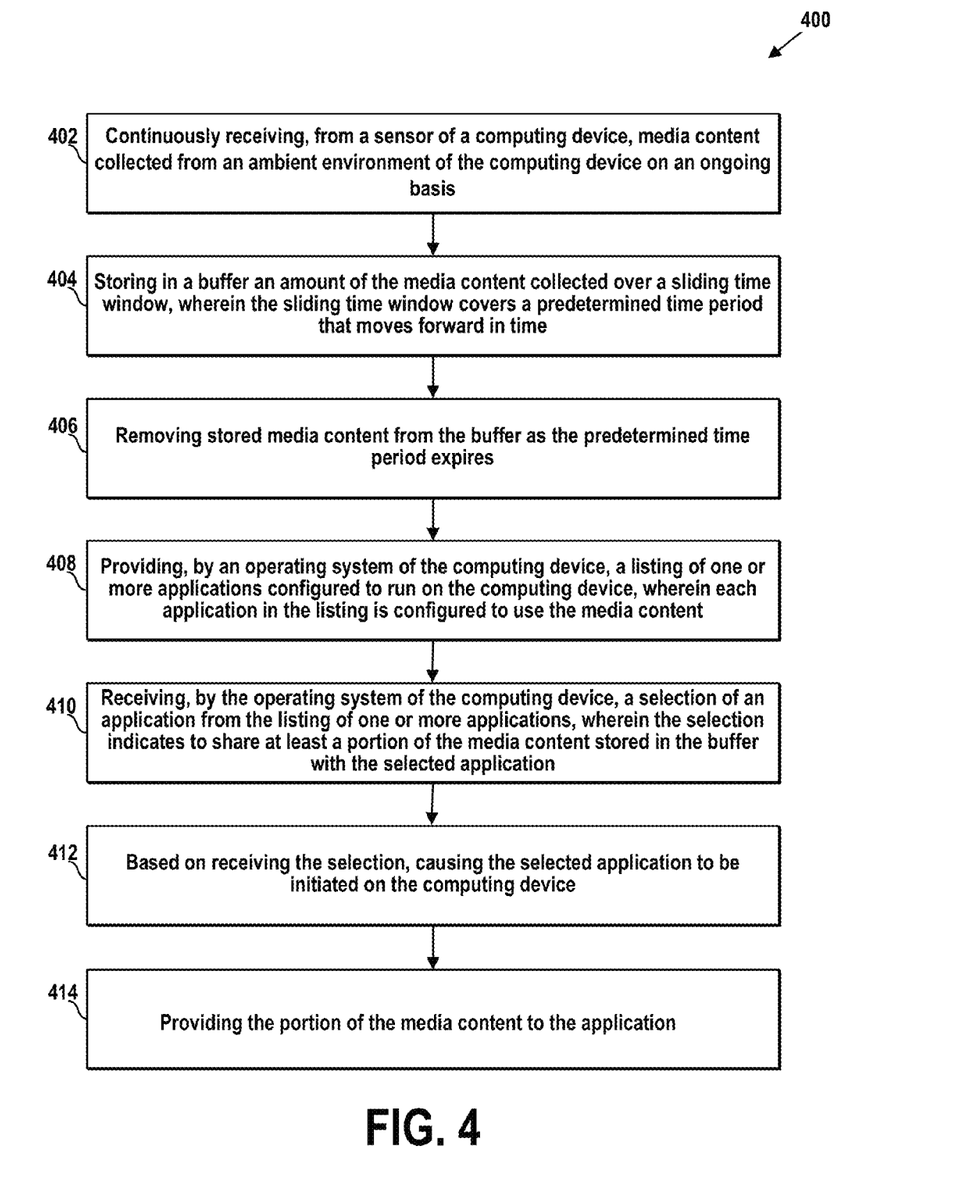
FIG. 4 is a block diagram of an example method for providing a portion of media content to an application.

FIG. 4 is a block diagram of an example method 400 for providing a portion of media content to an application, in accordance with at least some embodiments described herein. Method 400 shown in FIG. 4 presents an embodiment of a method that, for example, could be used with a computing device. Method 400 may include one or more operations, functions, or actions as illustrated by one or more blocks of 402-414. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

Functions of the method 400 may be fully performed by a computing device, or may be distributed across multiple computing devices and/or a server. In some examples, the computing device may receive information from sensors of the computing device, or where the computing device is a server the information can be received from another device that collects the information.

At block 402, the method 400 includes continuously receiving, from a sensor of a computing device, media content collected from an ambient environment of the computing device on an ongoing basis. The media content may be received by a processor of a computing device. The sensor may be a wireless internet receiver, radio antenna, GPS receiver, magnetometer, microphone, sound meter, photodetector, accelerometer, or camera. The computing device may be a laptop, desktop, or tablet computer, or a smartphone. The media content collected from the ambient environment of the computing device may include audio content or visual content or any sensory data that the computing device is configured to detect. Continuously receiving media content may include continuously receiving audio content from a continuously enabled microphone. Continuously receiving media content may also include continuously receiving video content from a continuously enabled camera.

In some examples, receiving the media content may be conditional based on whether a display screen of the computing device is illuminated. For instance, the display screen may be illuminated when the device is in use, and media content may be more readily used when the device is in use. In addition, collecting media content when the device is in use can be helpful to reduce power consumed by the computing device.

In further examples, when the sensor is collecting media content, a representation of an indicator can be provided for display that indicates that the sensor is collecting media content. The representation may be provided as a blinking light emitting diode (LED) or an icon displayed by a display screen. The indicator may also be displayed in a notification area of an interactive display screen of the computing device.

At block 404, the method 400 includes storing in a buffer an amount of the media content collected over a sliding time window. The sliding time window may cover a predetermined time period that moves forward in time. The sliding time window may be a fixed amount of time or may vary based on an amount of storage available on the computing device. A processor may store the amount of the media content in the buffer. The buffer may include volatile or non-volatile memory devices and may be a section of a memory device designated to store media content collected over the sliding time window. The sliding time window may correspond to the range of time at which media content stored in the storage buffer was collected by the sensor of the computing device. The predetermined time period may have a specific duration that may be changed by the processor based on inputs received from an input device.

At block 406, the method 400 includes removing stored media content from the buffer as the predetermined time period expires. Removing stored media content from the buffer may be performed by a processor. Removing stored media content from the buffer may further include removing amounts of stored media content in an order the amounts were stored in the buffer. Removing stored media content from the buffer may also include deleting stored media content or overwriting stored media content with more recently collected media content. Media content which has been stored in the storage buffer for at least as long as the predetermined time period may be deleted or overwritten with more recent stored media content. The buffer may include a circular buffer configured to store media content on a first-in-first-out basis.

At block 408, method 400 includes providing, by an operating system of the computing device, a listing of one or more applications configured to run on the computing device. Each application in the listing may be configured to use the media content. The listing of one or more applications configured to run on the computing device may include applications installed on the computing device. The listing may also include applications not installed on the computing device but configured to run on the computing device if installed on the computing device. A processor may execute the operating system to provide the listing of applications. The listing may also be provided for display in a notification drawer. The notification drawer may include a listing of at least one notification provided by an application configured to run on the computing device. For example, notifications may indicate that a new message has been received by the computing device or that an update is available for an application installed on the computing device. The notification drawer may be displayed by an interactive display screen of the computing device based on receiving an input at a notification area of the interactive display screen. The notification area may be an area adjacent to a perimeter of the interactive display screen and may be designated to display indicators indicating notifications. For example, the notification area may contain a clock display or a battery meter display.

At block 410, method 400 includes receiving, by the operating system of the computing device, a selection of an application from the listing of one or more applications. The selection may indicate to share at least a portion of the media content stored in the buffer with the selected application. The selection may be received by a processor and provided by an input device. The selected application may or may not be installed on the computing device. The selection may further indicate to share with the selected application all compatible media content collected by the sensor. Compatible media content may include media content that the selected application is configured to use. This method may be useful to provide an application subsequent media content by receiving a single selection.

In some examples, the selection may be indicative of a plurality of applications from the listing of one or more applications, so that multiple applications are selected.

At block 412, method 400 includes, based on receiving the selection, causing the selected application to be initiated on the computing device. The selected application may be caused to be initiated by a processor. Initiating the selected application may include changing a state of the selected application. For example, initiating the selected application may include starting the application by loading the application into RAM for execution. An application may be run in a background where the application is not necessarily visible to a user of the device, or in a foreground where the application is visible for direct usage by a user, for example. In some examples, initiating the application may include bringing an application running in the background to the foreground. In still other examples, initiating the application may include causing the application to perform any number of functions, and such functions may occur in the background or in the foreground.

At block 414, method 400 includes providing the portion of the media content to the application. The portion of the media content may be provided by a processor. The application may be an application configured to use the portion of the media content.

The method 400 may also include receiving, by the operating system, an input that indicates to change the duration of the predetermined time period or to change an amount of media content stored in the buffer. For example, the operating system may include a number of settings, one of which allows a user to set the time period over which media content is stored. The time period could be, e.g., 3-5 minutes, and thus, media content from the previous 3-5 minutes may be collected and stored.

In further examples, the portion of the media content may be provided to the application based on receipt of a keyword or voice command. The keyword may be a word or phrase recognized by the computing device as an instruction to share media content stored in the buffer with an application. Thus, the method 400 may also include, based on receiving media content representing the keyword, sharing the media content stored in the buffer with an application.

In another example, the processor may receive from an application a request to access the media content. The processor may provide a listing of one or more applications and the media content may be provided to the application based on receiving permission to access the media content. Permission may be received in a form of an input.

Figure 5:
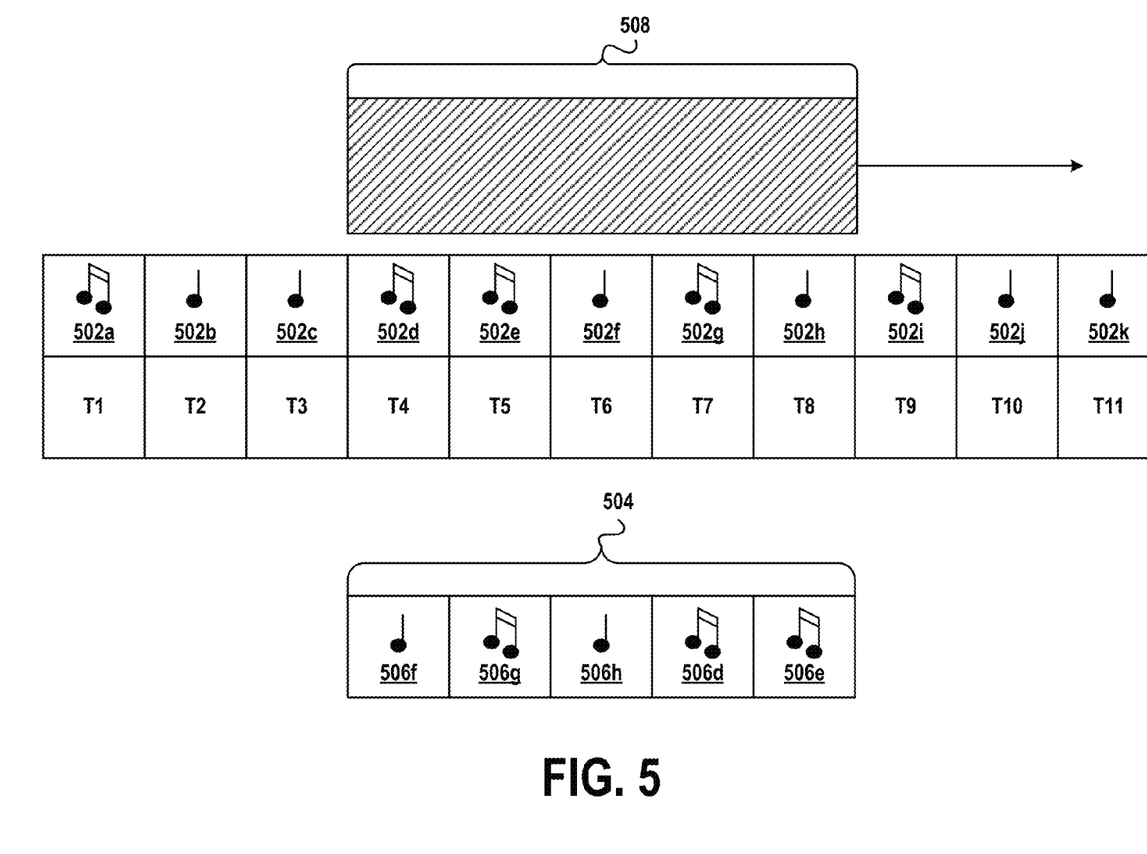
FIG. 5 is a conceptual illustration of a timeline of collected media content.

FIG. 5 is a conceptual illustration of a timeline of collected media content. In FIG. 5, media content 502a-k of an ambient environment of a computing device is collected, and provided to a storage buffer 504 that stores media content 506d-h over a sliding time window 508.

Media content 502a-k may represent ambient audio or video information or sensory data of any kind that a sensor of a computing device may be configured to detect. Although FIG. 5 conceptually illustrates that the media content includes audio or musical content, the media content may take other forms as well, or combinations of other types of collected content. Media content 502d may exist in the ambient environment during an arbitrary time frame T4. Media content 502e may exist in the ambient environment during an arbitrary time frame T5. Media content 502f may exist in the ambient environment during an arbitrary time frame T6. Media content 502g may exist in the ambient environment during an arbitrary time frame T7. Media content 502h may exist in the ambient environment during an arbitrary time frame T8. Data representing media content 502a-k may be stored in storage buffer 504 while sliding time window 508 coincides with the respective time periods corresponding to media content 502a-k.

Storage buffer 504 may be included in a computing device. Storage buffer 504 may be volatile or non-volatile memory configured to store data representing media content 502a-k. During an arbitrary time frame T8, storage buffer 504 may contain stored media content 506d-h. Sliding time window 508 may coincide with arbitrary time frames T4 to T8. For example, stored media content 506d-h contained in storage buffer 504 may include data representing media content 502d-h, respectively. Stored media content 506d-h may be deleted or overwritten when stored media content 506d-h has been stored in storage buffer 504 for at least as long as a predetermined time period. Stored media content 506d-h may be deleted or overwritten when sliding time window 508 no longer coincides with time periods respectively corresponding to media content 502d-h.

Sliding time window 508 may represent a shifting time interval that moves forward in time. Sliding time window 508 may correspond to data representing ambient media content 502a-k that may be stored in storage buffer 504. Sliding time window 508 may coincide with arbitrary time frames T4 to T8 at which media content 502d-h exist in the ambient environment of a computing device. Storage buffer 504 may store data representing media content 502d-h while sliding time window 508 coincides with time periods at which media content 502d-h exist in the ambient environment of a computing device. The data may include stored media content 506d-h. The duration of sliding time window 508 may correspond to the predetermined time period.

By further example, as time progresses, sliding time window 508 may coincide with arbitrary time frames T7 to T11 at which media content 502g-k exist in the ambient environment of a computing device. During an arbitrary time frame T11, storage buffer 504 may store data representing media content 502g-k. During an arbitrary time frame T11, sliding time window 508 may correspond with time periods at which media content 502g-k exist in the ambient environment of a computing device. The data stored in the storage buffer may include stored media content 506g-k.

Figure 6:
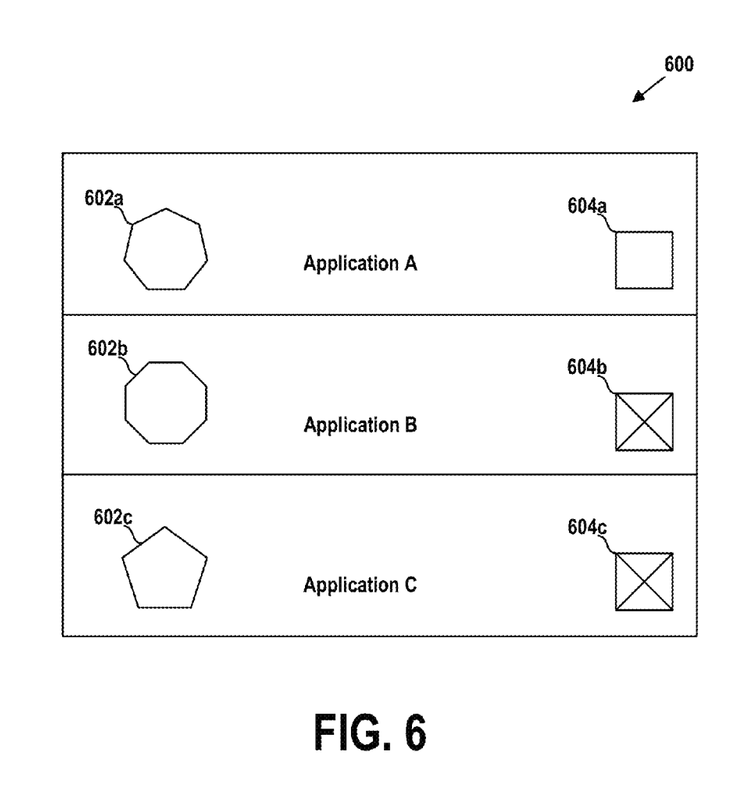
FIG. 6 is an example listing of one or more applications configured to run on a computing device.

FIG. 6 is an example listing of one or more applications configured to run on a computing device. Each application in the listing may be configured to use a given type of stored media content. Illustrated in FIG. 6 are application icons 602a-c and application sharing checkboxes 604a-c.

Application icons 602a-c may be visual representations of applications A, B, and C, respectively. Applications A-C may be configured to run on a computing device and may be configured to use media content stored on the computing device. Application icons 602a-c may be visual depictions of a function of the respective applications or may be a symbol otherwise recognizable as being associated with the application. For example, application icon 602a may appear to be a visual depiction of a notepad and may represent an application associated with a word processor.

Application sharing checkboxes 604a-c may be indicative of whether stored media content is shared with the respective applications. For example, application sharing checkbox 604a may be unchecked or void of markings indicative that media content will be shared with application A. Application A may be denied access to the media content. By further example, application sharing checkboxes 604b and 604c may be checked or marked in a manner indicating that media content is shared with application B and application C, respectively. The media content may be shared with applications B and C.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   continuously receiving, from a sensor of a computing device, media content collected from an ambient environment of the computing device on an ongoing basis;
   storing in a buffer an amount of the media content collected over a sliding time window, wherein the sliding time window covers a predetermined time period that moves forward in time;
   removing stored media content from the buffer as the predetermined time period expires;
   providing, by an operating system of the computing device, a listing of one or more applications configured to run on the computing device, wherein each application in the listing is configured to use the media content;
   receiving, by the operating system of the computing device, a selection of an application from the listing of the one or more applications, wherein the selection indicates to share at least a portion of the media content stored in the buffer with the selected application, wherein the selection further indicates to share with the selected application subsequent compatible media content collected by the sensor, wherein the subsequent compatible media content is media content that the selected application is configured to use and is stored in the buffer subsequent to receiving the selection;
   based on receiving the selection, causing the selected application to be initiated on the computing device; and
   providing at least the portion of the media content and the subsequent compatible media content to the application.

2. The method of claim 1, wherein the sensor of the computing device includes one or more of a wireless internet receiver, a radio antenna, a GPS receiver, a magnetometer, a microphone, a sound meter, a photodetector, an accelerometer, or a camera.

3. The method of claim 1, wherein the media content collected from the ambient environment of the computing device includes audio content or visual content.

4. The method of claim 1, wherein continuously receiving media content comprises continuously receiving audio content from a continuously enabled microphone.

5. The method of claim 1, wherein continuously receiving media content comprises continuously receiving video content from a continuously enabled camera.

6. The method of claim 1, wherein the listing of one or more applications configured to run on the computing device includes applications installed on the computing device.

7. The method of claim 1, further comprising:
   receiving from an application a request to access the media content;
   wherein providing the listing of one or more applications comprises:
      providing the listing based on receiving permission to access the media content.

8. The method of claim 1, further comprising:
   receiving, by the operating system, an input that indicates to change a duration of the predetermined time period; and
   changing the duration of the predetermined time period.

9. The method of claim 1, further comprising:
receiving, by the operating system, an input that indicates to change an amount of media content stored in the buffer; and
changing the amount of media content stored in the buffer.

10. The method of claim 1, further comprising:
receiving, by the operating system, a selection of a plurality of applications from the listing of one or more applications, wherein the selection of the plurality of applications indicates to provide at least a portion of the media content stored in the buffer with the plurality of applications;
based on receiving the selection of the plurality of applications, causing the plurality of applications to be initiated on the computing device; and
simultaneously providing the portion of the media content to the plurality of applications.

11. The method of claim 1, wherein the computing device includes a display screen, and the method further comprises:
determining whether the display screen is illuminated; and
based on the display screen being illuminated, continuously receiving the media content.

12. The method of claim 1, further comprising:
determining whether the sensor is collecting media content; and
while the sensor is collecting media content, providing for display a representation of an indicator that indicates that the sensor is collecting media content.

13. The method of claim 12, wherein the indicator is displayed in a notification area of an interactive display screen of the computing device, wherein the notification area is an area adjacent to a perimeter of the interactive display screen and the notification area contains indicators indicating notifications.

14. The method of claim 1, further comprising:
determining whether the media content received from the sensor includes media content representing a keyword, wherein the keyword is a word or phrase recognized by the computing device as an instruction to share media content stored in the buffer with an application; and
based on receiving media content representing the keyword, sharing the media content stored in the buffer with an application.

15. A computer readable storage memory having stored therein instructions, that when executed by a computing device, cause the computing device to perform functions comprising:
continuously receiving, from a sensor of the computing device, media content collected from an ambient environment of the computing device on an ongoing basis;
storing in a buffer an amount of the media content collected over a sliding time window, wherein the sliding time window covers a predetermined time period that moves forward in time;
removing stored media content from the buffer as the predetermined time period expires;
providing, by an operating system of the computing device, a listing of one or more applications configured to run on the computing device, wherein each application in the listing is configured to use the media content;
receiving, by the operating system of the computing device, a selection of an application from the listing of one or more applications, wherein the selection indicates to share at least a portion of the media content stored in the buffer with the selected application, wherein the selection further indicates to share with the selected application subsequent compatible media content collected by the sensor, wherein the subsequent compatible media content is media content that the selected application is configured to use and is stored in the buffer subsequent to receiving the selection;
based on receiving the selection, causing the selected application to be initiated on the computing device; and
providing the portion of the media content and the subsequent compatible media content to the application.

16. The computer readable storage memory of claim 15, wherein the functions further comprise:
receiving, by the operating system, a selection of a plurality of applications from the listing of one or more applications, wherein the selection of the plurality of applications indicates to provide at least a portion of the media content stored in the buffer with the plurality of applications;
based on receiving the selection of the plurality of applications, causing the plurality of applications to be initiated on the computing device; and
simultaneously providing the portion of the media content to the plurality of applications.

17. A system comprising:
one or more processors configured to execute functions of an operating system; and
memory configured to store instructions, that when executed by the one or more processors, cause the system to perform functions comprising:
continuously receiving media content collected from an ambient environment on an ongoing basis;
storing in a buffer an amount of the media content collected over a sliding time window, wherein the sliding time window covers a predetermined time period that moves forward in time;
removing stored media content from the buffer as the predetermined time period expires;
providing, by the operating system, a listing of one or more applications configured to run on the system, wherein each application in the listing is configured to use the media content;
receiving, by the operating system, a selection of an application from the listing of one or more applications, wherein the selection indicates to share at least a portion of the media content stored in the buffer with the selected application, wherein the selection further indicates to share with the selected application subsequent compatible media content collected by the system, wherein the subsequent compatible media content is media content that the selected application is configured to use and is stored in the buffer subsequent to receiving the selection;
based on receiving the selection, causing the selected application to be initiated; and
providing the portion of the media content and the subsequent compatible media content to the application.

18. The system of claim 17, wherein the functions further comprise:
receiving, by the operating system, a selection of a plurality of applications from the listing of one or more applications, wherein the selection of the plurality of applications indicates to provide at least a portion of the media content stored in the buffer with the plurality of applications;
based on receiving the selection of the plurality of applications, causing the plurality of applications to be initiated on the system; and
simultaneously providing the portion of the media content to the plurality of applications.

19. The system of claim 17, wherein the functions further comprise:
- receiving from an application a request to access the media content;
- wherein providing the listing of one or more applications comprises:
    - providing the listing based on receiving permission to access the media content.

20. A method comprising:
- continuously receiving, from a sensor of a computing device, media content collected from an ambient environment of the computing device on an ongoing basis;
- storing in a buffer an amount of the media content collected over a sliding time window, wherein the sliding time window covers a predetermined time period that moves forward in time;
- removing stored media content from the buffer as the predetermined time period expires;
- providing, by an operating system of the computing device, a listing of one or more applications configured to run on the computing device, wherein each application in the listing is configured to use the media content, wherein the listing is provided for display in a notification drawer, wherein the notification drawer includes a listing of at least one notification provided by an application configured to run on the computing device and the notification drawer is displayed based on receiving an input at a notification area of an interactive display screen of the computing device, wherein the notification area is an area adjacent to a perimeter of the interactive display screen and the notification area is designated to display indicators indicating notifications;
- receiving, by the operating system of the computing device, a selection of an application from the listing of the one or more applications, wherein the selection indicates to share at least a portion of the media content stored in the buffer with the selected application;
- based on receiving the selection, causing the selected application to be initiated on the computing device; and
- providing at least the portion of the media content to the application.

* * * * *